3,269,750
PIVOTED DRAW-BAR WITH LOCK
Keith W. Tantlinger, Grosse Pointe Shores, Mich., assignor to Fruehauf Corporation, Detroit, Mich., a corporation of Michigan
Filed Oct. 15, 1964, Ser. No. 404,040
4 Claims. (Cl. 280—474)

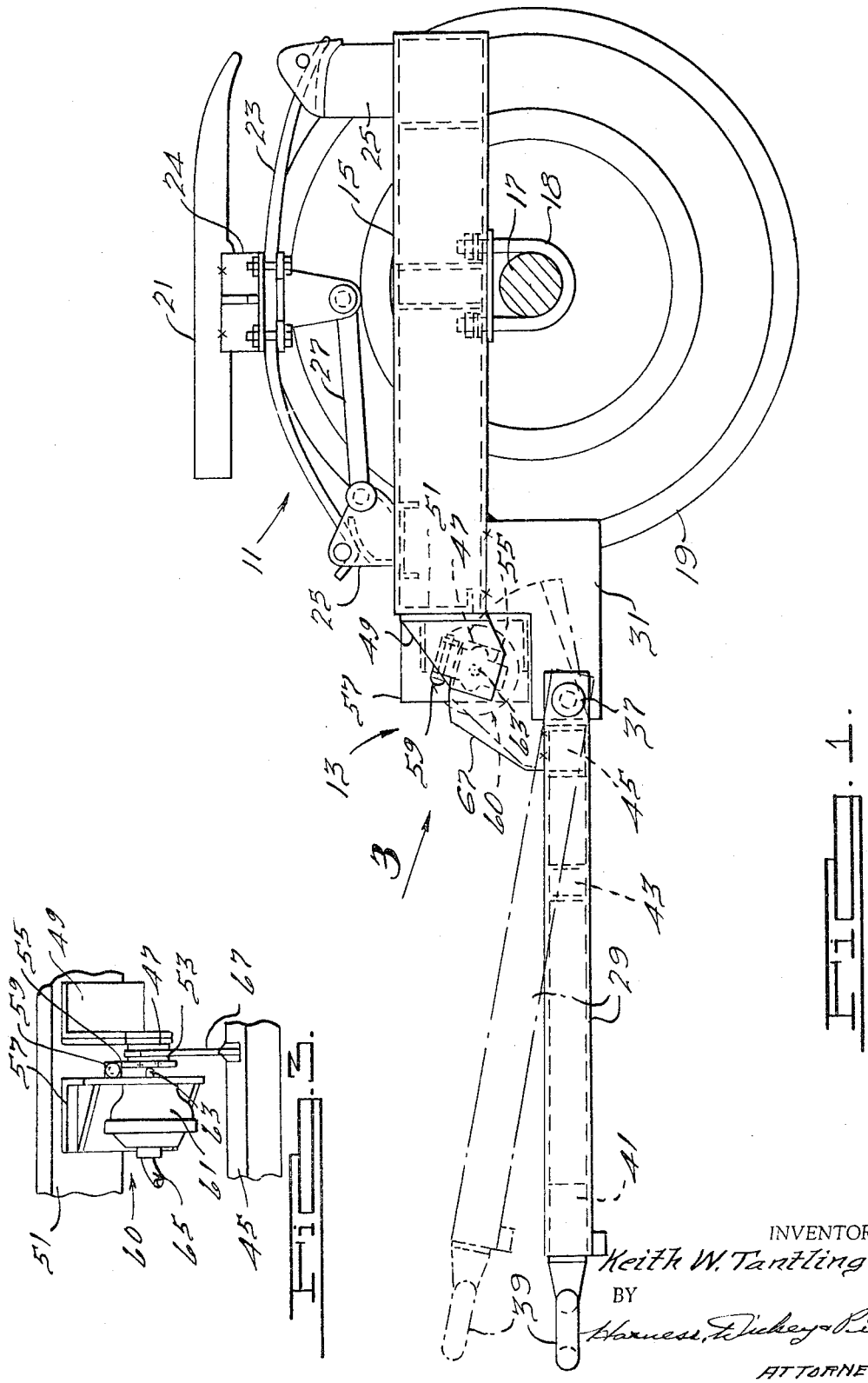

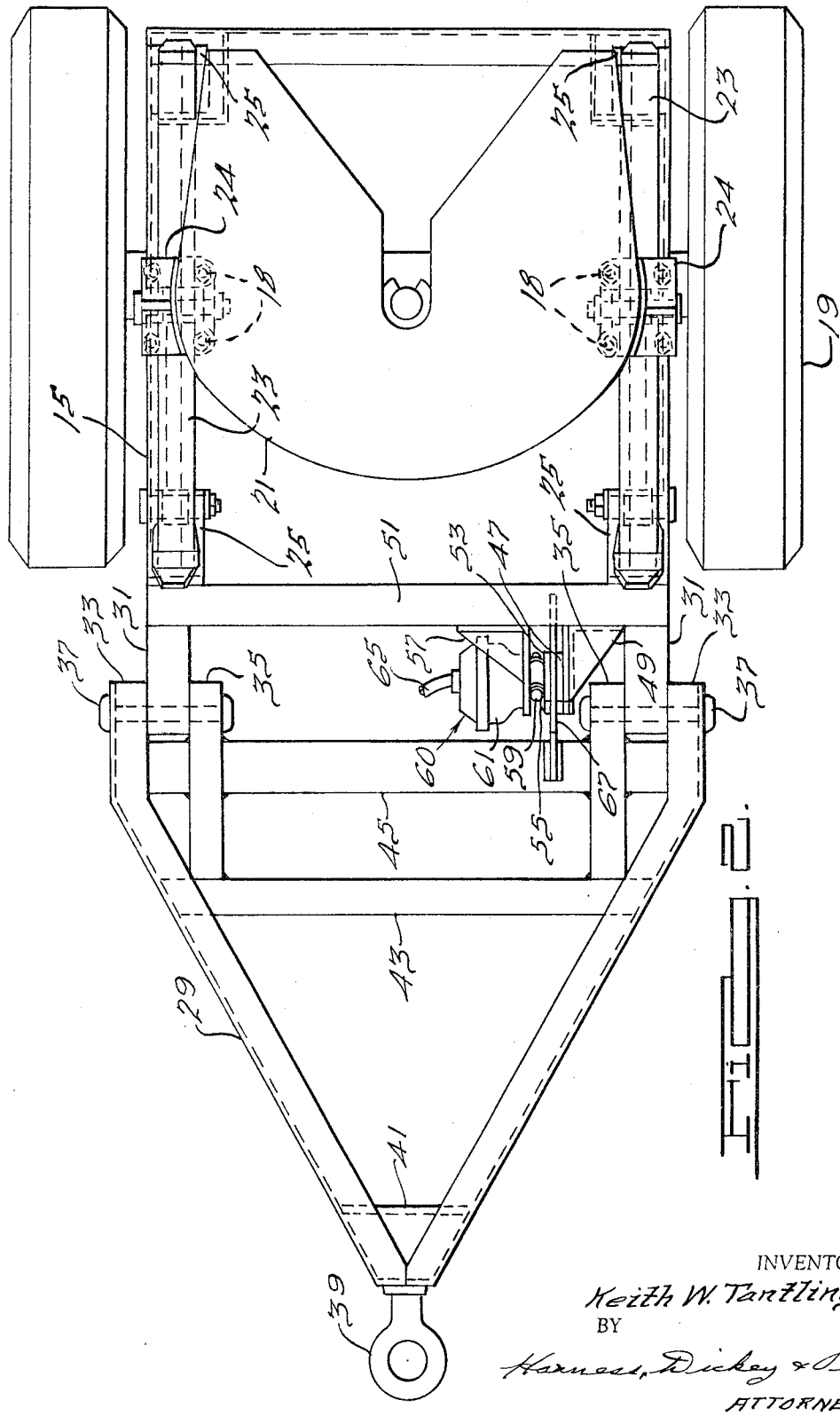

This invention relates to vehicle hitches, and more particularly to a device for automatically locking a pivotally mounted vehicle hitch drawbar in an elevated position.

In general, vehicle hitches interconnecting a tractor and a trailer dolly, two trailers disposed in tandem, or a tractor and a trailer include a drawbar pivotally carried at its rearward end by the dolly or trailer and adapted for connection at its forward end to the tractor or forward trailer. Such drawbars are, of necessity, relatively large and heavy and therefore difficult to handle, since tractive effort is transmitted through them to the dolly or trailer.

The need for the pivotal connection between the drawbar and the dolly or trailer frame arises in order to permit limited relative vertical movement between the tractor and dolly or trailer and between tandem trailers when the vehicle is traveling over rough pavement or on inclined surfaces. However, because of this pivotal connection, the free end of the drawbar will fall under its own weight when disconnected at its forward end, which often results in the forward end of the drawbar becoming embedded in the ground. Thus, when it is desired to reconnect the drawbar to a tractor or a forward tandem trailer, it has in the past been necessary to manually free the drawbar, raise it to the height of the hitch and support it at this height while moving the tractor or forward trailer into hitching engagement therewith. Because of the relative large size and weight of such drawbars, this is not an easy task. For this reason, various mechanical lift devices for raising drawbars of this type have been proposed and used with varying degrees of success. However, these lift devices are relatively cumbersome to handle and still require considerable time and effort on the part of the driver or his helper to rehitch a trailer to another trailer or to a tractor. For example, the drawbar lift itself must first be positioned before it is able to elevate the drawbar to the correct height before rehitching the trailer.

The present invention solves the aforementioned difficulties by providing a locking device for the vehicle drawbar of the type hereinabove referred to which is automatically operable to lock and maintain the drawbar at the height of the forward hitch before the drawbar is unhitched. The drawbar locking device is designed for actuation in direct response to setting of the dolly or trailer axle brakes pursuant to detachment of the tractor therefrom. Thus, upon detachment of the tractor, or forward trailer in a tandem trailer arrangement, the drawbar remains locked in an elevated position. In reattaching the tractor or forward trailer, no height adjustment for the drawbar is needed and the attachment can be made quickly and simply by moving the forward vehicle into the hitching position. Thereafter, when the dolly or trailer axle brakes are released, the drawbar lock is automatically released freeing the drawbar for normal pivotal operation.

Accordingly, one object of the present invention is a pivotal dolly or trailer drawbar locking device adapted for automatic actuation prior to detachment of the free end of the drawbar.

A further object is a locking device of the above character which is automatically deactivated after reattaching the free end of the drawbar.

A further object is a locking device of the above character operable in response to setting the trailer axle brakes to lock the drawbar in a selected position.

A further object is a locking device of the above character which is relatively inexpensive to manufacture, sturdy in construction and reliable in use.

Further objects and advantages of the present invention will become more apparent from a consideration of the following detailed description and claims taken in conjunction with the drawings in which:

FIGURE 1 is a side elevational view of a vehicle hitch embodying the principles of the present invention;

FIG. 2 is a top plan view of the structure of FIG. 1; and

FIG. 3 is a fragmentary view of the structure of FIG. 1 taken in the direction of the arrow "3" showing the drawbar locking assembly.

Referring now more specifically to the drawings, a trailer supporting dolly, shown by way of illustration, is indicated generally at 11 and is provided with a connecting hitch 13 embodying the principles of the present invention. The dolly 11 may include a frame 15 fixed to an axle 17 by conventional U-bolts 18 and supported by a pair of ground contacting wheels 19 in the usual manner. Additionally, the dolly 11 may be provided with a conventional fifth wheel plate 21 resiliently supported upon the frame 15 through conventional leaf springs 23 which are fixed to the plate 21 by brackets 24 and supported upon the frame 15 through supporting brackets 25. A pair of radius rods 27 pivotally interconnect the forwardmost supporting brackets 25 to a respective one of the brackets 24 to transmit tractive effort from the frame 15 to the fifth wheel plate 21.

The connecting hitch 13 includes a drawbar 29 pivotally attached to a pair of depending frames 31 which are, in turn, integral with, welded, or otherwise secured, to the frame 15. The drawbar 29 is provided with suitably spaced parallel ear portions 33 and 35 adapted to receive the depending frames 31 and through which suitable pivot pins 37 may extend in the usual manner.

The drawbar 29 is provided with a forward connecting means, such as an eye 39, for removable attachment to a tractor or forward trailer (not shown) by a conventional hitch pin (not shown). Additionally, suitable rigidifying cross-frame structural members 41, 43 and 45 may be provided to reinforce the drawbar 29.

During normal operation, the drawbar 29 which is fixed to a tractor or forward trailer (not shown) through the connecting eye 39 transmits tractive effort to the frame 15 and is freely pivoted thereto through the pivot pins 37. However, when disconnected at its forward end, the drawbar 29 is free to pivot downwardly under its own weight to a position resting upon the ground. As set forth hereinabove, the relative heavy weight of the drawbar may cause it to become embedded in the ground if it is allowed to fall freely. Thereafter, when the tractor is reattached, the drawbar must be freed and lifted, either manually or by a mechanical lift, to tractor height. In practice, the repositioning and reattaching of the drawbar is a tedious and cumbersome process usually requiring two men and it is this drawbar repositioning that the present invention is designed to eliminate.

In accordance with the present invention, the hitch 13 is provided with a suitable friction plate 47 carried by an angle member 49 fixed to a structural cross-member 51 of the frame 15, as by welding. See FIG. 3. The friction plate 47 may be of any suitable friction material such as that used in conventional wheel brake lining and is preferably of generally flat configuration. A second friction plate 53 of similar construction is disposed opposite the plate 47 and is fixed to a shoe member 55. An angle member 57 fixed to the structural member 51 pivotally carries the shoe 55 through a hinge 59 for movement toward and away from the angle 49 and the first friction plate 47. A segmental plate 67 is fixed to the drawbar 29 as by welding to the structural member 45 and is positioned for movement between the friction plates 47 and 53.

An air motor 60 including a cylinder chamber 61 is provided with a piston rod 63 adapted to engage the shoe 55 and bias it and the friction plate 53 toward the first friction plate 47. A suitable conduit 65 connects the chamber 61 of the air motor 60 to the conventional air brake system (not shown) for the dolly or trailer wheel axles so that when the air brake system is disconnected and the dolly or trailer axles locked, the air motor 60 functions to bias the friction plate 53 against the plate 67 and this plate against the friction plate 47. When the air brakes are released, as by recoupling, the air motor 60 releases its bias on the shoe 55 thereby allowing the plate 67 and the drawbar 29 to move.

From the foregoing, it should be apparent that when the trailer or dolly axle air brakes are set, the drawbar is locked against pivotal movement. Thereafter, the tractor can be detached from the drawbar which will remain in the position assumed before tractor detachment. When the tractor is reattached, no adjustment of drawbar elevation is needed and the tractor and drawbar can be joined immediately. Thus, the present invention provides a relatively simple but effective drawbar locking device which is automatically effective to lock the drawbar upon setting the trailer brakes.

While a preferred embodiment of the present invention has been illustrated and described in detail hereinabove, various additions, substitutions, modifications and omissions may be made thereto without departing from the spirit of the invention as encompassed by the appended claims.

What is claimed is:

1. A locking device for a vehicle drawbar having one end pivotally carried by a trailer frame and the other end adapted to be removably connected to a vehicle tractor, said locking device comprising friction means carried by said trailer frame,
   plate means fixed to said drawbar adjacent said one end thereof and adapted for engagement by said friction means in a variety of drawbar pivotal positions,
   means for actuating said friction means into frictional engagement with said plate means,
   said actuating means being operable in response to a braking device for said trailer
   whereby said drawbar is locked against pivotal movement when said tractor is detached therefrom.

2. A locking device for a vehicle drawbar having one end pivotally carried by a trailer frame and the other end adapted to be removably connected to a vehicle tractor, said locking device comprising friction means carried by said trailer frame,
   plate means fixed to said drawbar adjacent said one end thereof and adapted for engagement by said friction means in a variety of drawbar pivotal positions,
   means for actuating said friction means into and out of frictional engagement with said plate means,
   said actuating means being automatically operable in response to setting the brakes for said trailer to frictionally engage said plate means and being automatically operable out of frictional engagement with said plate means when said trailer brakes are released.

3. A locking device for a vehicle drawbar having one end pivotally carried by a trailer frame and the other end adapted to be removably connected to a vehicle tractor, said locking device comprising first friction means fixedly carried by said trailer frame,
   second friction means movably carried by said trailer frame and movable toward and away from said first friction means,
   plate means fixed to said drawbar adjacent said one end thereof and adapted for movement between and engagement by said first and second friction means in a variety of drawbar pivotal positions,
   means for moving said second friction means into engagement with said plate means to frictionally grip said plate means between said first and second friction means,
   said actuating means being operable in response to a braking device for said trailer
   whereby said drawbar is locked against pivotal movement when said tractor is detached therefrom.

4. A locking device for a vehicle drawbar having one end pivotally carried by a trailer frame and the other end adapted to be removably connected to a vehicle tractor, said locking device comprising first friction means fixedly carried by said trailer frame,
   second friction means pivotally carried by said trailer frame and movable toward and away from said first friction means,
   plate means fixed to said drawbar adjacent said one end thereof and adapted for movement between and engagement by said first and second friction means in a variety of drawbar pivotal positions,
   means for pivoting said second friction means into engagement with said plate means to frictionally grip said plate means between said first and second friction means,
   said actuating means being operable in response to a braking device for said trailer
   whereby said drawbar is locked against pivotal movement when said tractor is detached therefrom.

References Cited by the Examiner
UNITED STATES PATENTS

| | | | |
|---|---|---|---|
| 1,892,004 | 12/1932 | Reid. | |
| 2,254,532 | 9/1941 | Knox | 280—418 |
| 2,452,710 | 11/1948 | Allen | 280—489 |
| 2,830,829 | 4/1958 | Gensinger | 280—491 |

LEO FRIAGLIA, *Primary Examiner.*